(12) United States Patent
Yamasaki (10) Patent No.: US 8,988,816 B1
(45) Date of Patent: Mar. 24, 2015

(54) HEAD AMPLIFIER AND MAGNETIC DISK APPARATUS

(71) Applicant: Kabushiki Kaisha Toshiba, Minato-ku, Tokyo (JP)

(72) Inventor: Nobuyoshi Yamasaki, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/172,402

(22) Filed: Feb. 4, 2014

Related U.S. Application Data (60) Provisional application No. 61/904,118, filed on Nov. 14, 2013.

(51) Int. Cl.
| | | |
|---|---|---|
| G11B 21/02 | (2006.01) | |
| G11B 27/36 | (2006.01) | |
| G11B 5/09 | (2006.01) | |
| G11B 5/596 | (2006.01) | |
| G11B 5/60 | (2006.01) | |

(52) U.S. Cl.
CPC .......... *G11B 5/6076* (2013.01); *G11B 5/59666* (2013.01)
USPC .................................. 360/75; 360/31; 360/46

(58) Field of Classification Search
None
See application file for complete search history.

(56) References Cited

U.S. PATENT DOCUMENTS

| | | | |
|---|---|---|---|
| 3,654,628 A * | 4/1972 | Goodale | 360/75 |
| 7,136,241 B2 * | 11/2006 | Taniguchi et al. | 360/51 |
| 7,957,087 B2 | 6/2011 | Nishimoto et al. | |
| 8,369,190 B2 * | 2/2013 | Polley et al. | 369/13.11 |
| 2011/0075291 A1 | 3/2011 | Cho | |
| 2013/0003217 A1 | 1/2013 | Kim | |

* cited by examiner

*Primary Examiner* — Andrew L Sniezek
(74) *Attorney, Agent, or Firm* — Knobbe, Martens, Olson & Bear LLP (57) ABSTRACT

According to one embodiment, a magnetic disk apparatus includes a plurality of magnetic disks, a plurality of heads which execute recording or reading with respect to the magnetic disks, a plurality of sensors provided in each of the heads and output a signal in accordance with a flying height of the heads from the magnetic disks, a writing module which simultaneously writes servo data in the plurality of magnetic disks by using the plurality of heads, and a control module which simultaneously executes a process for detecting a crash of the heads into the magnetic disks for the plurality of heads based on each output signal of the plurality of sensors when the servo data is written.

17 Claims, 6 Drawing Sheets

HEAD AMPLIFIER AND MAGNETIC DISK APPARATUS

CROSS-REFERENCE TO RELATED APPLICATIONS

This application claims the benefit of U.S. Provisional Application No. 61/904,118, filed Nov. 14, 2013, the entire contents of which are incorporated herein by reference.

FIELD

Embodiments described herein relate generally to a head amplifier and a magnetic disk apparatus comprising the head amplifier.

BACKGROUND

Because of a partial projection on a magnetic disk (hereinafter sometimes simply referred to as a disk) etc., a magnetic disk apparatus may not appropriately control levitation (flying of a head). Thus, a head may make contact with a disk, or a head may crash into a disk. (Hereinafter, this phenomenon is referred to as a crash.) When such a crash occurs, a recording error or a reading error is caused due to high levitation of the head associated with the crash, reduction in accuracy of positioning of the head, and high-temperature degaussing by heat generation at the time of contact, etc. In the case where the crash occurs, the disk or head may be damaged. Therefore, the disk or head in the crash is preferably exchanged for a normal one.

In the case where the flying amount of a head from a disk is optimally controlled, an output signal of a head disk interface (HDI) sensor which outputs a signal corresponding to the gap between the head and the disk is used. A waveform in which the output signal passed through a filter does not precisely reflect a waveform showing the crash. Thus, it is difficult to accurately detect a crash by using a signal which passed through the filter.

DETAILED DESCRIPTION

Various embodiments will be described hereinafter with reference to the accompanying drawings.

In general, according to one embodiment, a magnetic disk apparatus comprises: a plurality of heads configured to execute recording or reading with respect to the magnetic disks; a plurality of sensors provided in the heads, respectively, each of the sensors configured to output a signal in accordance with a flying height of the head from the magnetic disk; a writing module configured to simultaneously write servo data in the plurality of magnetic disks by using the plurality of heads; and a control module configured to simultaneously execute a process of detecting a crash of the heads into the magnetic disks for the plurality of heads based on each output signal of the plurality of sensors when writing the servo data.

Hereinafter, exemplary embodiments of the magnetic disk apparatus will be described in detail with reference to the accompanying drawings.

Figure 1:
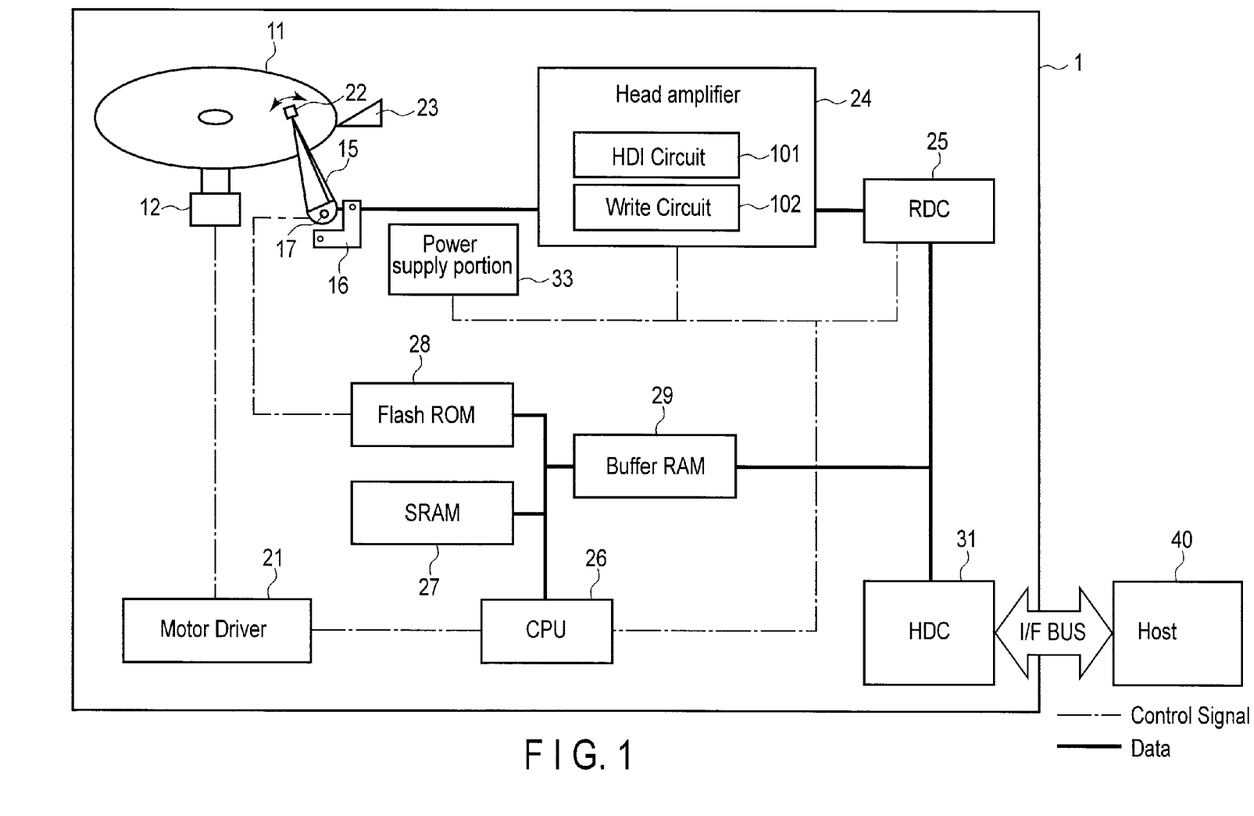
FIG. 1 is a block diagram showing a structure of a magnetic disk apparatus according to an embodiment.

FIG. 1 is a block diagram showing a structure of a magnetic disk apparatus 1 according to an embodiment. The magnetic disk apparatus 1 of the embodiment comprises, as an outline structure, a plurality of (not shown in the figure) magnetic disks 11, a plurality of (not shown in the figure) magnetic heads 22, a plurality of (not shown in the figure) actuator arms 15 and a plurality of (not shown in the figure) ramps 23, etc., inside a housing (not shown in the figure). The magnetic disk apparatus 1 further comprises a spindle motor 12 which rotates the magnetic disks 11, and a voice coil motor (VCM) 16, etc.

The magnetic disk 11 is rotated by the spindle motor 12. The actuator arm 15 is rotatably attached to a pivot 17. The magnetic head 22 is attached to an end of the actuator arm 15. The voice coil motor (VCM) 16 is connected to the other end of the actuator arm 15. The voice coil motor (VCM) 16 rotates the actuator arm 15 based on the pivot 17, and determines a position, floating the magnetic head 22 at an arbitrary position on the radius of the magnetic disk 11.

As shown in FIG. 1, the magnetic disk apparatus 1 of the present embodiment comprises, as an electronic hardware structure, a motor driver 21, a head amplifier 24, a read write channel (RDC) 25, a hard disk controller (HDC) 31, a central processing unit (CPU) 26, a random access memory (SRAM) 27 which is a memory for operation, a flash ROM (read only memory) 28 which is a nonvolatile memory, and a buffer RAM 29 for temporal storage.

In response to the instruction from the CPU 26, the motor driver 21 drives the spindle motor 12 and rotates the magnetic disk 11 based on the rotation axis at the predetermined rotation speed. In response to the instruction from the CPU 26, the motor driver 21 drives the voice coil motor (VCM) 16 and moves the magnetic head 22 at the distal end of the actuator arm 15 in the radius direction of the magnetic disk 11.

The magnetic head 22 writes data in the magnetic disk 11, and reads data recorded in the magnetic disk 11.

Figure 2:
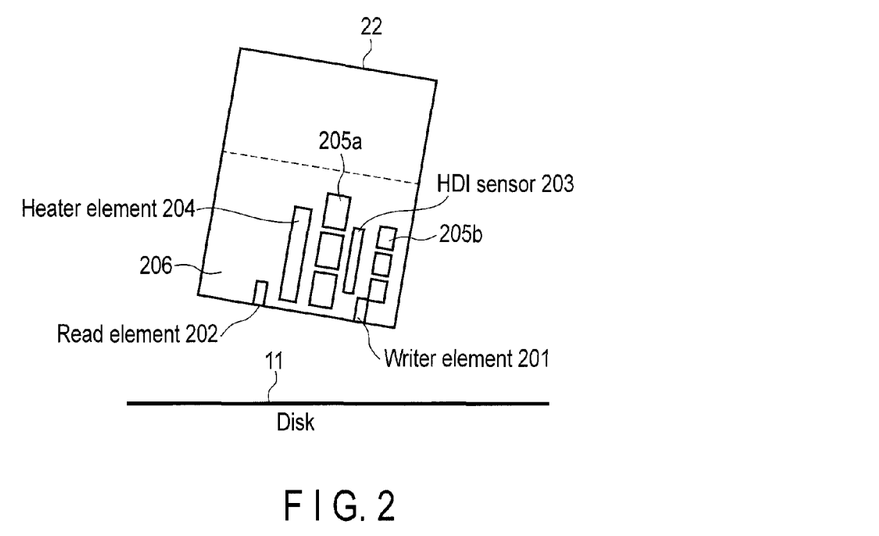
FIG. 2 illustrates a structure of a head used for the magnetic disk apparatus.

The head amplifier 24 amplifies a readout signal read by a read element (read head) 202 (FIG. 2) from the magnetic disk 11, and outputs the readout signal to the RDC 25. The head amplifier 24 amplifies a write signal supplied from the RDC 25, and outputs the write signal to a write element (write head) 201 (FIG. 2). The head amplifier 24 includes an HDI circuit 101 described later and a write circuit 102 which is also used for servo data writing.

The RDC 25 code-demodulates a signal output from the head amplifier 24, and outputs the signal as digital data to the HDC 31. The RDC 25 code-demodulates write data supplied from the HDC 31, and outputs the write data to the head amplifier 24.

The HDC 31 controls data transmission and reception between the HDC 31 and a host computer (host) 40 via an I/F bus, controls the buffer RAM 29, and corrects an error of data with respect to the recording data, etc. The buffer RAM 29 is used as a cache of data transmitted to or received from the host computer 40. Further, the buffer RAM 29 is used for temporarily storing data read from the magnetic disk 11, data written into the magnetic disk 11, or control firmware read from the magnetic disk 11, etc.

The CPU 26 controls the magnetic disk apparatus 1 as a whole in line with the magnetic disk apparatus controlling program which is stored in the flash ROM 28 in advance.

FIG. 2 illustrates a structure of the head 22 used for the magnetic disk apparatus.

The head 22 includes the write element 201, the read element 202, a heater element 204, and an HDI sensor 203. It is noted that the reference numerals 205a and 205b denote coils for writing.

The write element 201 writes data into the data area of the magnetic disk 11 by the magnetic field generated from the magnetic pole of the write element 201. The read element 202 reads data recorded in the magnetic disk 11 by reading the change of the magnetic field on the magnetic disk 11 as data. It is noted that when the rotation of the magnetic disk 11 is suspended, etc., the magnetic head 22 escapes on the ramp 23 (FIG. 1).

The HDI sensor 203 comprises a resistive element (not shown in the drawings). The HDI sensor 203 is used for detecting a gap or a crash between the write element 201 or the read element 202 and the magnetic disk 11 based on the voltage between terminals of the resistive element. The detection by the HDI sensor 203 will be described in detail later.

The heater element 204 heats up a head slider 206 of the magnetic head 22 by receiving electrical power from a power supply portion 33. Since the shape of the head slider 206 is changed by this application of heat, the gap between the magnetic head 22 and the magnetic disk 11 is changed. In other words, the flying height of the magnetic head 22 from the magnetic disk 11 is changed.

Next, the HDI sensor 203 is explained.

Servo data is written (hereinafter referred to as "servo data writing") after the gap between the head 22 and the disk 11 is optimized by using the output signal from the HDI sensor 203. The HDI sensor 203 is an element whose resistance changes depending on the temperature. When the gap between the head and the disk has reached the minimum distance (for example, 1 to 2 nm) by controlling the heater power supplied from the power supply portion 33 to the heater element 204, the crest value of the output signal of the HDI sensor 203 is higher than the predetermined value. In this manner, the distance is determined to have reached the limitation point. The actual writing is executed by decreasing the heater power by the predetermined value in such a way that the gap between the head and the disk can be the optimal distance (for example, approximately 5 nm).

Figure 3:
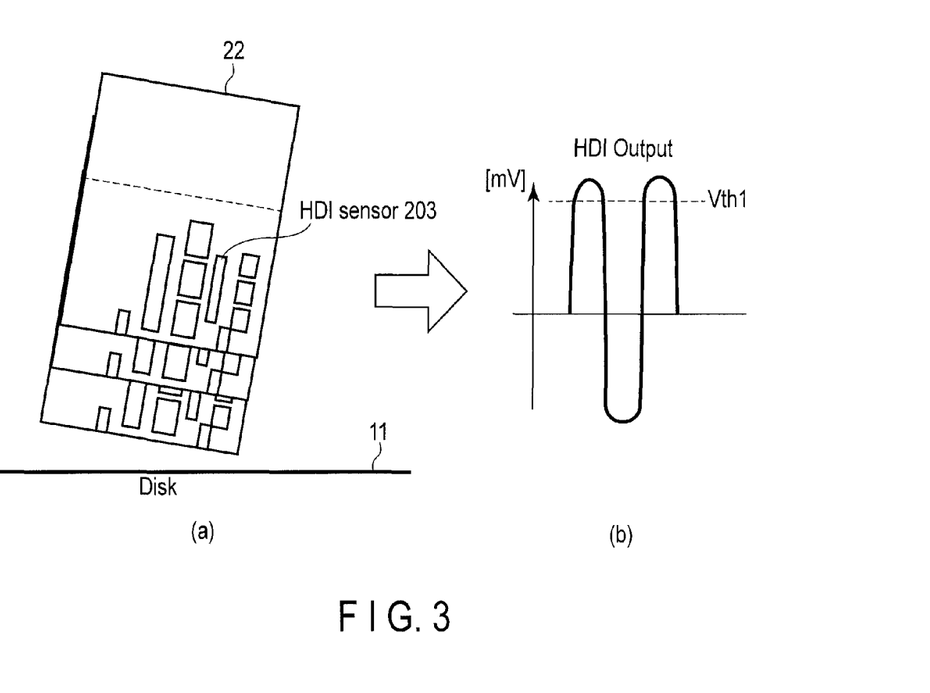
FIG. 3 illustrates a state at which a gap between the head and a disk has reached a minimum distance.

FIG. 3 illustrates a state at which the gap between the head 22 and the disk 11 has reached the minimum distance. In the present application, the state at which the gap between the head 22 and the disk 11 has reached the minimum distance as shown in the figure is referred to as "touchdown". At the state of touchdown, the head 22 vibrates as illustrated in FIG. 3(a). This vibration is transmitted as heat change to the HDI sensor 203. The waved signal (for example, a few hundred of KHz) shown in FIG. 3(b) is output from the HDI sensor 203. This signal is compared with the predetermined threshold value Vth1. When the signal exceeds the predetermined threshold value Vth1, the gap is determined to have reached the touchdown state, and the magnitude of the heater power at that time is recorded in, for example, the buffer RAM 29.

The signal shown in FIG. 3(b) is obtained by letting the output signal of the HDI sensor pass through the noise filter included in the head amplifier 24. The noise filter is provided in order to avoid false detection of touchdown. In the case of a magnetic disk apparatus comprising a plurality of heads, one noise filter is shared among a plurality of heads. Thus, the detection of touchdown is independently executed for each head by sharing one noise filter.

Figure 4:
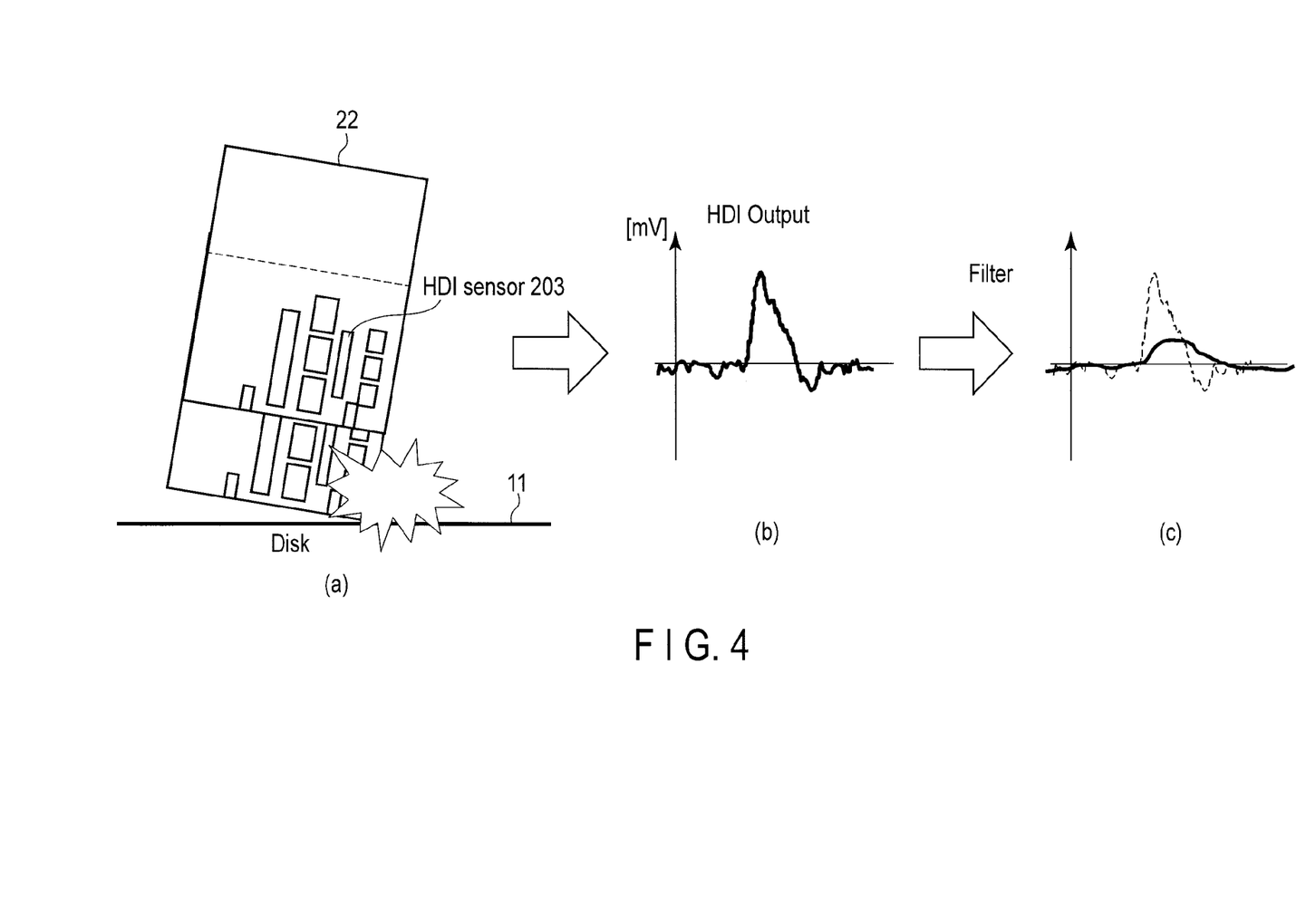
FIG. 4 illustrates an HDI signal waveform at the time of a crash of the head into the disk.

FIG. 4 illustrates an HDI signal waveform at the time of the crash of the head 22 into the disk 11.

FIG. 4(a) shows the state of the crash of the head 22 into the disk 11. FIG. 4(b) shows a raw signal waveform of an HDI output signal. FIG. 4(c) shows the HDI output signal obtained through a noise filter. Thus, the HDI output signal at the time of the crash of the head 22 into the disk 11 has a frequency component which is different from touchdown. Therefore, if an HDI signal is observed by using a noise filter, the sensitivity for the crash of the head 22 into the disk 11 is decreased, and the crash cannot be accurately judged.

Figure 5A:
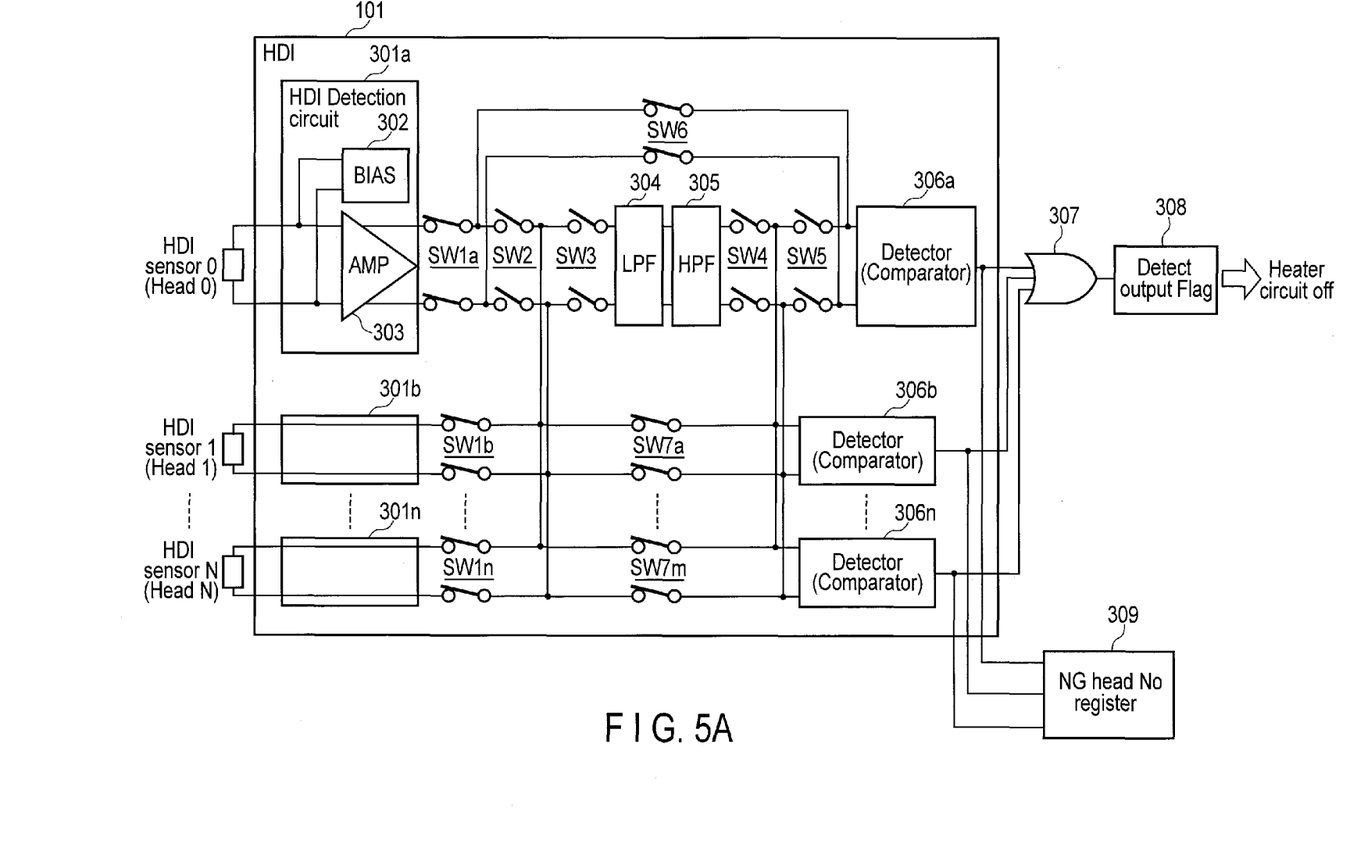
FIG. 5A illustrates a structure of an HDI circuit provided within a head amplifier shown in FIG. 1.

FIG. 5A is a block diagram showing a circuit structure of the HDI circuit 101 provided within the head amplifier 24 shown in FIG. 1. Similarly, FIG. 5B is a block diagram showing a circuit structure of the write circuit 102 provided within the head amplifier 24.

As illustrated in FIG. 5A, the HDI circuit 101 comprises HDI detection circuits 301a to 301n, switches SW1a to SW1n, switches SW2 to SW6, switches SW7a to SW7m, a low-pass filter (LPF) 304, a high-pass filter (HPF) 305, and detectors 306a to 306n. Each output terminal of the detectors 306a to 306n is connected to the input terminals of an OR gate 307 and an NG head number register 309. The output terminal of the OR gate 307 is connected to a detect output flag 308. Each HDI detection circuit 301 contains a constant current circuit (BIAS) 302 and an amplifier (AMP) 303.

Figure 5B:
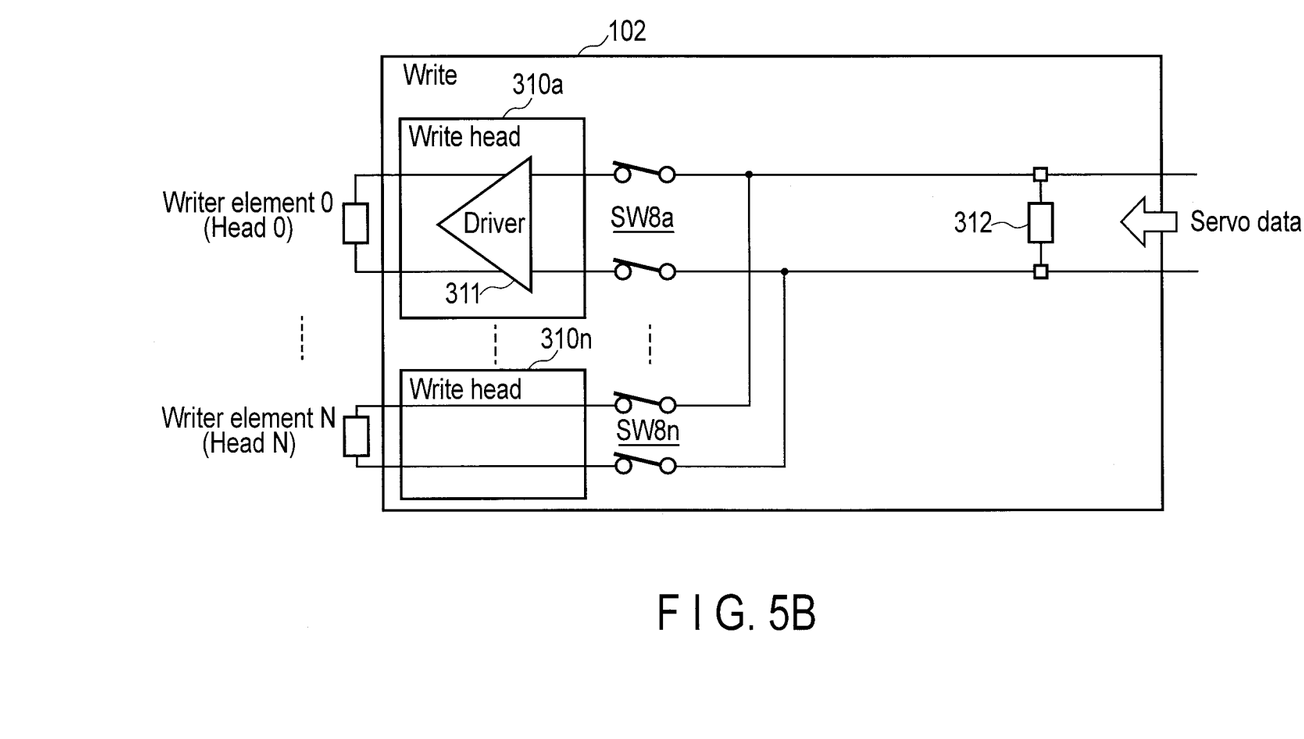
FIG. 5B illustrates a structure of a write circuit provided within the head amplifier shown in FIG. 1.

As illustrated in FIG. 5B, the write circuit 102 contains write head circuits 310a to 310n, switches SW8a to SW8n and a termination resistor 312. Each of the write head circuits 310a to 310n contains a driver 311.

Next, the operations of the present embodiment are explained.

At the beginning, touchdown is detected and the optimal flying height of the head is set before servo data writing. First, touchdown by an HDI sensor 0 of a head 0 is detected. In this detection, under the control of the CPU 26, the switches SW1a and SW2 to SW5 are turned on, and the switches SW1b to SW1n, SW6 and SW7a to SW7m are turned off. A constant current is supplied from the constant current circuit (BIAS) 302 to the HDI sensor 0. The HDI sensor comprises a resistor inside the sensor. The resistor is an element whose resistance increases in accordance with the increase in temperature.

When the spindle motor 12 rotates and the head is arranged at the predetermined position, the voltage between terminals (HDI signal) corresponding to the temperature of the HDI sensor 0 is input to the amplifier 303 and amplified. The amplified HDI signal is input to the detector 306a through the switches SW1a, SW2 and SW3, the low-pass filter 304, the high-pass filter 305 and the switches SW4 and SW5. At this time, a high-pass component and a low-pass component are removed from the HDI signal by the low-pass filter 304 and the high-pass filter 305 respectively. In other words, noise removal is executed.

When the gap between the head and the disk has reached a minimum value by increasing the power supplied from the power supply portion 33 to the heater element 204 from 0, the head 22 vibrates as shown in FIG. 3 explained above. By the thermal change of the HDI sensor 203 at that time, the HDI signal shown in FIG. 3(b) is input to the detector 306a. The detector 306a compares the HDI signal with the predetermined threshold value Vth1, and outputs the comparison results to the OR gate 307. The output signal of the OR gate 307 is input to the detect output flag 308. If the HDI signal exceeds the predetermined threshold value Vth1 as shown in FIG. 3(b), the output of the OR gate 307 goes high, and the detect output flag 308 is set.

The CPU 26 detects touchdown by the flag 308 being set. The CPU 26 reduces the power from the power supply portion 33 to the heater element 204 by the predetermined value from the power at the time of touchdown, and sets the gap between the head and the disk so as to be the optimal distance. After that, the switch SW1a is turned off.

Similarly, switches SW1b to SW1n are independently turned on in order. By using the output signals of HDI sensors 1 to N provided in heads 1 to N respectively, the gap between each head and the disk is set to an optimal distance.

Next, the operations at the time of servo data writing and the operations at the time of a crash are explained.

At the time of servo data writing, under the control of the CPU 26, all of the switches SW8a to SW8n of the write circuit 102 shown in FIG. 5B are turned on as shown in FIG. 5B. The servo data input from the RDC 25 is simultaneously output into all of write elements 0 to N through the termination resistor 312.

Moreover, at the time of servo data writing, each switch of the HDI circuit 101 shown in FIG. 5A is set as shown in FIG. 5A. Thus, under the control of the CPU 26, the switches SW1a to SW1n are turned on. The switches SW2 to SW5 are turned off. The switches SW6 and SW7a to SW7m are turned on. Therefore, the output signals of the HDI sensors 0 to N are input to the detectors 306a to 306n through the amplifier 303 without involving the low-pass filter 304 and the high-pass filter 305. In other words, the output signals are input by bypassing the low-pass filter 304 and the high-pass filter 305. The output signals of the detectors 306a to 306n are input to the OR gate 307 and the NG head number register 309.

Each detector 306 compares the HDI signal with the predetermined threshold value Vth2 (FIG. 6), and outputs the comparison results into the OR gate 307. The output signal of the OR gate 307 is input to the detect output flag 308. If the HDI signal exceeds the predetermined threshold value Vth2, the output of the OR gate 307 goes high, and the detect output flag 308 is set. At this time, the number of the crashed head is recorded in the NG head number register 309.

The CPU 26 detects a crash of the head into the disk by the flag 308 being set. The CPU 26 stops all power from the power supply portion 33 to the heater element 204 of each head, and suspends servo data writing. The CPU 26 reads the head number recorded in the NG head number register 309, and for example, notifies the host 40 of the head number.

After that, the power source of the magnetic disk apparatus 1 is turned off, and the crashed head and disk are exchanged for appropriate ones. Further, the detection of touchdown, servo data writing, and the detection of a crash are executed as described above again. These processes are repeated until the crash between the head and the disk is not generated.

Figure 6:
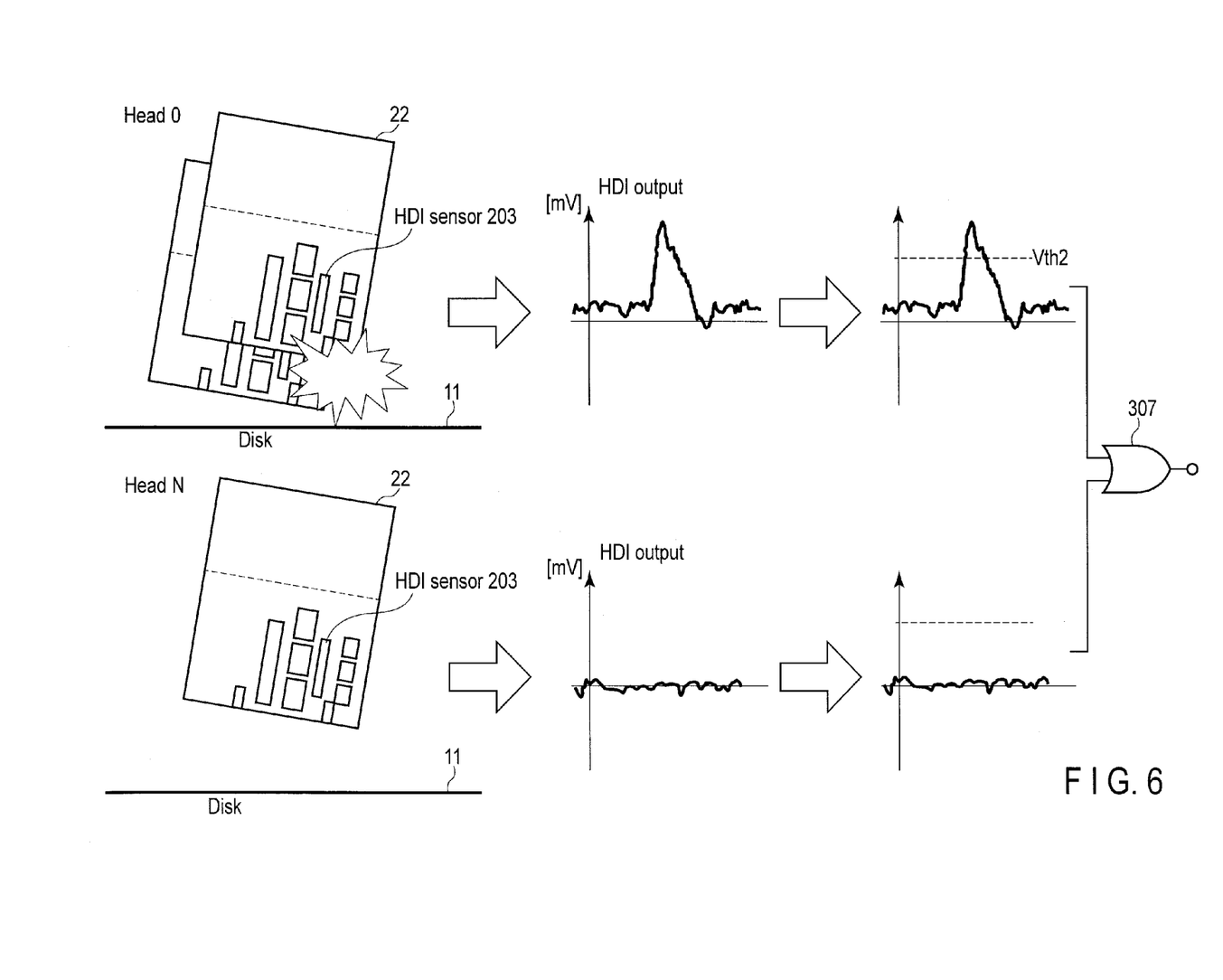
FIG. 6 illustrates an example of an HDI signal output from each HDI sensor provided in a plurality of heads at the time of servo data writing.

FIG. 6 illustrates an example of the HDI signal output from each HDI sensor provided in a plurality of heads at the time of servo data writing. FIG. 6 shows the case of a crash of the head 0 into the disk. When the HDI output signal exceeds the predetermined threshold value Vth2, the OR gate 307 outputs a logical 1. Thus, a structure of observing an HDI signal without involving a filter which detects touchdown is provided for the crash of the head into the disk. This crash is a cause of head failure at the time of servo data writing. In this manner, the detection sensitivity for a crash is secured.

According to the embodiments explained above, problems caused by a crash can be discovered in a short amount of time at an early stage since the crash of each head is detected at the same time as the servo data writing which simultaneously uses a plurality of heads. Further, a product is dispatched from a plant after the crashed head and disk are exchanged for good components. Therefore, when a user actually uses the product, the possibility of head failure or disk damage caused by the crash of the head into the disk is considerably reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
    a plurality of magnetic disks;
    a plurality of heads configured to execute recording or reading with respect to the magnetic disks;
    a plurality of sensors provided in the heads, respectively, each of the sensors configured to output a signal in accordance with a flying height of the head from the magnetic disk;
    a writing module configured to simultaneously write servo data in the plurality of magnetic disks by using the plurality of heads;
    a control module configured to simultaneously execute a process of detecting a crash of the heads into the magnetic disks for the plurality of heads based on each output signal of the plurality of sensors when writing the servo data;
    a noise filter module configured to be shared with respect to each output signal of the plurality of sensors, wherein the control module executes a process for setting a flying height of the heads from the magnetic disks so as to be a predetermined value for the plurality of heads by letting each output signal of the sensors pass through the noise filter; and
    an OR gate into which each output signal of the plurality of sensors is input without passing through the noise filter, wherein the control module detects a crash in one of the plurality of heads based on an output signal of the OR gate.

2. The magnetic disk apparatus of claim 1, further comprising a register in which information is stored so as to be readable from outside, the information being configured to specify a head in which the crash is detected.

3. The magnetic disk apparatus of claim 2, further comprising a heater provided in each of the heads, and configured to heat up the head by being supplied of power and to change a flying height of the head from the magnetic disk by thermal deformation of the head associated with heating up, wherein the control module executes a process for setting the flying height of the heads from the magnetic disks so as to be a predetermined value independently for each of the heads based on each output signal of the sensors and power supplied to the heater.

4. The magnetic disk apparatus of claim 1, further comprising a heater provided in each of the heads, and configured to heat up the head by being supplied of power and to change a flying height of the head from the magnetic disk by thermal deformation of the head associated with heating up, wherein the control module executes a process for setting the flying height of the heads from the magnetic disks so as to be a predetermined value independently for each of the heads based on each output signal of the sensors and power supplied to the heater.

5. A magnetic disk apparatus comprising:
a plurality of magnetic disks;
a plurality of heads configured to execute recording or reading with respect to the magnetic disks;
a plurality of sensors provided in the heads, respectively, each of the sensors configured to output a signal in accordance with a flying height of the head from the magnetic disk;
a writing module configured to simultaneously write servo data in the plurality of magnetic disks by using the plurality of heads;
a control module configured to simultaneously execute a process of detecting a crash of the heads into the magnetic disks for the plurality of heads based on each output signal of the plurality of sensors when writing the servo data; and
a heater provided in each of the heads, and configured to heat up the head by being supplied of power and to change a flying height of the head from the magnetic disk by thermal deformation of the head associated with heating up,
wherein the control module stops power supply to the heater provided in each of the plurality of heads when a crash in one of the plurality of heads is detected.

6. The magnetic disk apparatus of claim 5, further comprising an OR gate into which each output signal of the plurality of sensors is input, wherein the control module detects a crash in one of the plurality of heads based on an output signal of the OR gate.

7. The magnetic disk apparatus of claim 6, wherein the control module executes a process for setting the flying height of the heads from the magnetic disks so as to be a predetermined value independently for each of the heads based on each output signal of the sensors and power supplied to the heater.

8. The magnetic disk apparatus of claim 5, further comprising a register in which information is stored so as to be readable from outside, the information being configured to specify a head in which the crash is detected.

9. The magnetic disk apparatus of claim 8, wherein the control module executes a process for setting the flying height of the heads from the magnetic disks so as to be a predetermined value independently for each of the heads based on each output signal of the sensors and power supplied to the heater.

10. The magnetic disk apparatus of claim 5, wherein the control module executes a process for setting the flying height of the heads from the magnetic disks so as to be a predetermined value independently for each of the heads based on each output signal of the sensors and power supplied to the heater.

11. A head amplifier in a magnetic disk apparatus comprising a plurality of magnetic disks, a plurality of heads configured to execute recording or reading with respect to the magnetic disks, and a plurality of sensors provided in the heads, respectively, each of the sensors configured to output a signal in accordance with a flying height of the head from the magnetic disk, the amplifier comprising:
a writing unit configured to simultaneously write data in the plurality of magnetic disks by using the plurality of heads;
a detection unit configured to detect that an output signal from a sensor of the plurality of sensors exceeds a predetermined level based on each output signal from the plurality of sensors when data is written through the writing unit; and
a noise filter configured to be shared with respect to each output signal of the plurality of sensors, wherein the noise filter is configured to be bypassed,
the detection unit is configured to output a first comparison result corresponding to comparison of, from output signals of the plurality of sensors, an output signal passed through the noise filter with a first threshold value, and to output a second comparison result corresponding to comparison of an output signal bypassed the noise filter, with a second threshold value different from the first threshold value.

12. The head amplifier of claim 11, wherein the detection unit further comprises:
a plurality of detection modules each configured to detect that each output signal from the plurality of sensors exceeds the predetermined level; and
an OR gate into which each output signal of the plurality of detection modules is input when the data is written.

13. The head amplifier of claim 12, further comprising a register in which information is stored so as to be readable from outside, the information being configured to specify a head corresponding to the sensor outputting the signal which exceeds the predetermined level.

14. The head amplifier of claim 12, wherein the detection unit comprises a plurality of switches, and
a circuit which lets the output signals of the sensors bypass the noise filter, and a circuit which lets the output signals pass through the noise filter by using the plurality of switches are structured.

15. The head amplifier of claim 11, further comprising a register in which information is stored so as to be readable from outside, the information being configured to specify a head corresponding to the sensor outputting the signal which exceeds the predetermined level.

16. The head amplifier of claim 15, wherein the detection unit comprises a plurality of switches, and
a circuit which lets the output signals of the sensors bypass the noise filter, and a circuit which lets the output signals pass through the noise filter by using the plurality of switches are structured.

17. The head amplifier of claim 11, wherein the detection unit comprises a plurality of switches, and
a circuit which lets the output signals of the sensors bypass the noise filter, and a circuit which lets the output signals pass through the noise filter by using the plurality of switches are structured.

* * * * *